Figure 1:
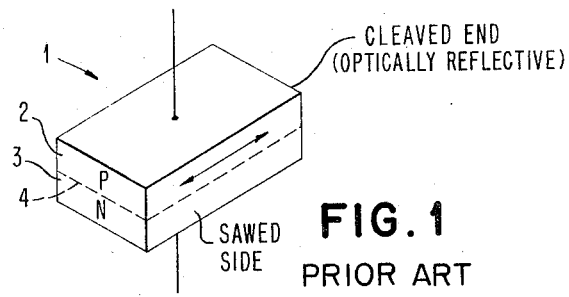

Feb. 7, 1967  A. B. FOWLER  3,303,431
COUPLED SEMICONDUCTOR INJECTION LASER DEVICES
Filed Feb. 10, 1964  2 Sheets-Sheet 1

INVENTOR
ALAN B. FOWLER

BY John F. Orlando Jr.
ATTORNEY

United States Patent Office 3,303,431
Patented Feb. 7, 1967

3,303,431
COUPLED SEMICONDUCTOR INJECTION LASER DEVICES
Alan B. Fowler, Yorktown Heights, N.Y., assignor to International Business Machines Corporation, New York, N.Y., a corporation of New York
Filed Feb. 10, 1964, Ser. No. 343,588
9 Claims. (Cl. 331—94.5)

This invention relates to signal translating devices utilizing semiconducting bodies and more particularly to a signal translating device of the type known as an injection laser.

During the past several years many interesting discoveries have occurred in the field of optical masers, or lasers, as they have become known. Early work in semiconductors had indicated that light emission could be obtained in a semiconductor body due to the phenomenon of recombination radiation. As the term recombination radiation is understood in the semiconductor art, it refers to a phenomenon where charge carriers, that is, holes and electrons, recombine and produce photons. This involves annhilating encounters between the aforesaid holes and electrons within a semiconductor body with the result that these carriers effectively disappear. Although certain kinds of recombinations had been known to produce radiation, until recently such radiation had not been efficiently produced and there had been a tendency of any emitted radiation to be absorbed immediately by the generating medium.

For reference to the subject of laser activity in semiconductors, which has now been shown to be efficient, the following articles may be consulted: (1) An article by R. J. Keyes and T. M. Quist, Proceedings of the IRE vol. 50, page 882, and (2) Applied Physics Letters, vol. 1, November 1962, page 62, by Nathan et al.

The stimulated emission of radiation in semiconductor devices has been characterized by an abrupt narrowing of the emission line width of light from a region in the immediate vicinity of the p-n junction which exists in the semiconductor body; and further, by a sharp increase in the light intensity in the direction of the junction plane at a high level of injected current.

The present invention is directed to the exploitation of stimulated emission radiation by means of the cooperative effects exhibited between coupled injection lasers. More particularly, the present invention utilizes the unique capability and attributes of coupled injection lasers which are made of the semiconductor material gallium arsenide, although it will be appreciated that the applicability of the principles discussed herein is not limited to this one material.

Accordingly, it is a primary object of the present invention to utilize the cooperative effects exhibited by coupled injection laser devices.

A further object is to realize an optical logic design from the cooperative effects.

Another object is to provide an optical AND logic element utilizing the cooperative effects exhibited by coupled injection laser devices.

A feature of the present invention utilizes the cooperative effects of injection lasers which are aligned end to end. A suitable term for this is "in-line" laser operation. These cooperative effects are distinguished by a lowering of current density threshold and an absence of enhanced mode selectivity. With end to end alignment and the attendant threshold lowering the coupled injection lasers are suitable for optical logic design.

The foregoing and other objects, features and advantages of the invention will be apparent from the following more particular description of preferred embodiments of the invention, as illustrated in the accompanying drawings.

Figure 2:
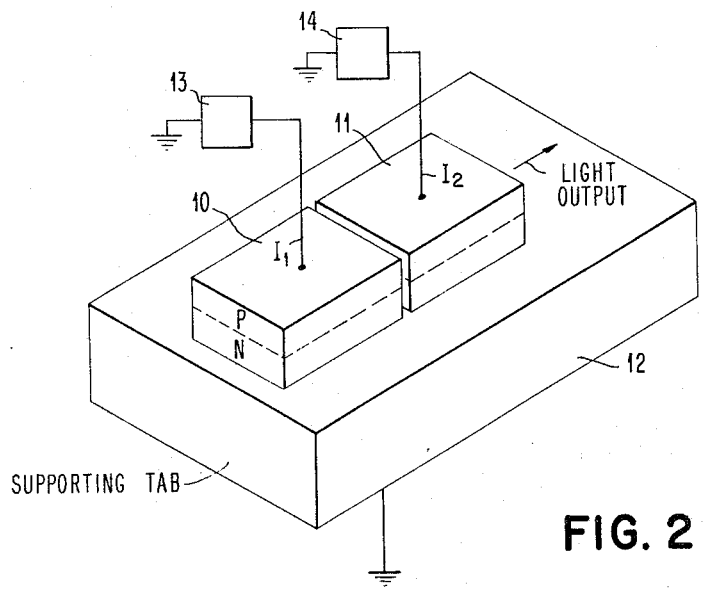
Figure 3:
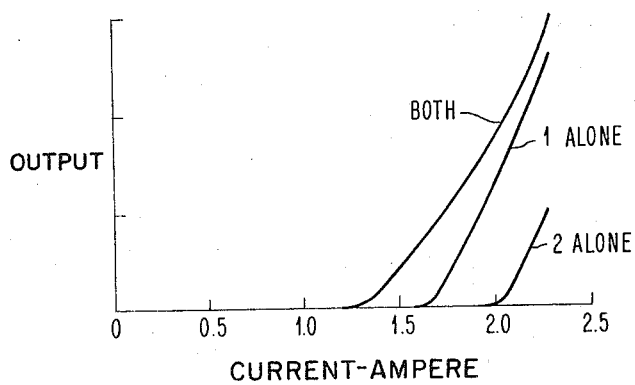
Figure 4:
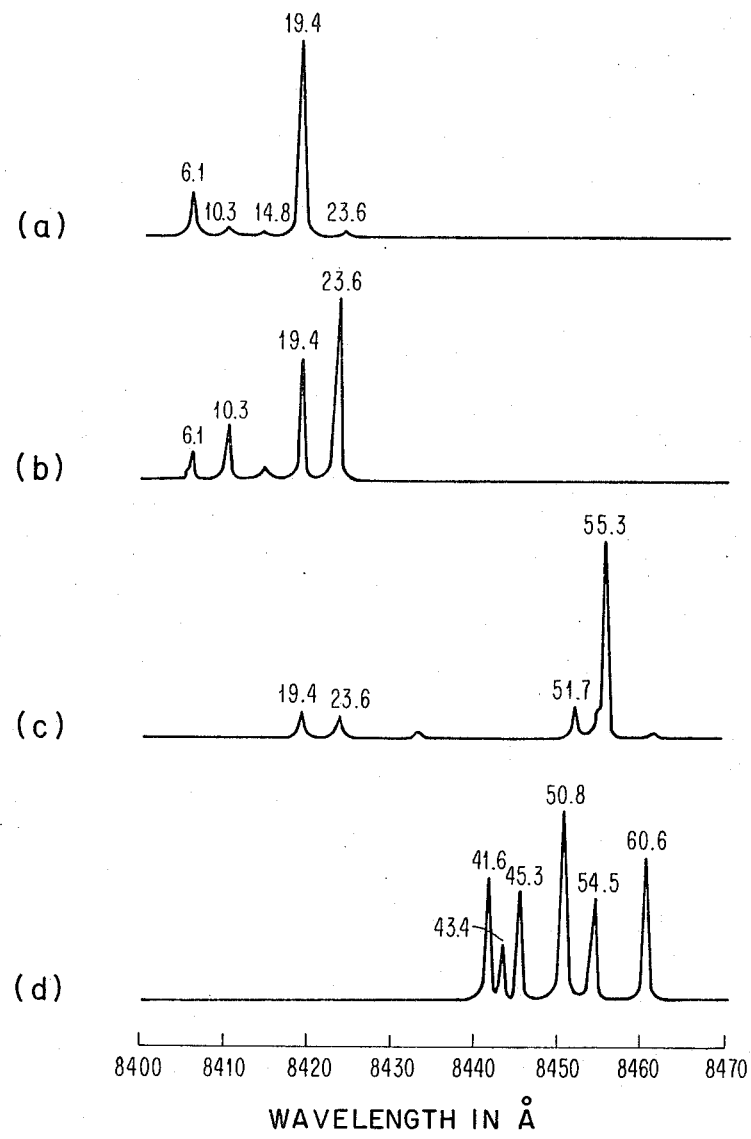

In the drawings:
FIGURE 1 is a perspective view of a p-n junction injection laser device known in the prior art.
FIGURE 2 is a perspective view of two coupled laser elements mounted to a common supporting tab and connected in circuit.
FIGURE 3 is a graph depicting the current density lowering effect for a typical laser pair having prescribed dimensions.
FIGURE 4 is a graph of the spectral output of the emission from the end of one of the laser elements of the typical coupled pair.

Referring now to FIGURE 1 there is depicted an injection laser device 1, already known, constituted of a semiconductor wafer having regions 2 and 3 therein of p and n type conductivity, respectively, which together define a junction 4. The semiconductor wafer is composed of GaAs which has been found to be a useful injection laser material. The original crystalline body is of n conductivity type and by a standard diffusion operation the p type region 2 is created. The injection laser structure results from cutting out of the much larger body the discrete wafer illustrated in FIGURE 1. With the fabrication of the unit as described, the device 1 is capable of producing stimulated emission. Such stimulated emission is achieved simply by forward biasing the p-n junction 4 so as to inject carriers into the respective regions. The observed radiation stems from the recombination of injected carriers with majority carriers already present in the given regions.

It has been found that the device of FIGURE 1 should be fashioned so that the ends are cleaved and the sides sawed to provide the most efficient stimulated emission. This emission is represented by the double headed arrow immediately adjacent the p-n junction 4. It indicates that the light is radiated from one cleaved end to the other in a so-called Fabry-Perot mode.

Referring now to FIGURE 2 two substantially identical injection laser units 10 and 11 are formed to embody the properties of the device previously described in FIGURE 1. These units are spaced very closely, on the order of 15 microns, so that the radiation from one is efficiently coupled to the other and further these units are substantially aligned, that is, they have a common longitudinal axis to within 5°. Units 10 and 11, which contain the aforesaid p-n junctions for proper laser action, have been fabricated from the same crystalline body and cut therefrom so that as a result the junction in each of them appears at an equal depth from the surface. Units 10 and 11 are shown soldered to the same supporting tab 12.

With perfect alignment of the units 10 and 11 the threshold for lasing would be reduced for the pair as long as the most important losses were end losses and the gain was appropriately proportional to the current density. That this is so may be most easily seen by examining the equation for current density at threshold:

$$G = AJ = \left(\frac{1}{L}\right)\ln\left(\frac{1}{R}\right) + \alpha$$

where L is the length of the laser; R is the reflectivity; $\alpha$ is the loss/unit length from absorption and diffraction losses and A is a constant relating the threshold current density, J, to the gain/unit length, G, at threshold. One would expect that the effect of coupling two lasers would be to increase the length in the above expression and to add some loss in the air space.

Unexpectedly it has been found that the coupled effect is not of the type discussed in the literature by Birnbaum and Stocker, Bulletin of the Physical Society, vol. 8, page 443, 1963, and by J. A. Fleck, Jr., Journal of Applied Physics, vol. 34, page 2997, 1963. The most striking evidence that the effect is not of the type discussed by the aforecited authors is that enhanced mode selectivity is not seen. It is found that when operated as a pair the modes common to both lasers were not the only observed modes. Thus Fabry-Perot conditions did not have to be satisfied in both lasers simultaneously. Further, in general the spectrum of the pair is found to be predominantly that of one of the units.

The application of the coupled injection laser structure of FIGURE 2 to an AND logic circuit design will now be explained. The threshold current for the independent laser units 10 and 11 have values $I_{T_1}$ and $I_{T_2}$ respectively, whereas the threshold current for the coupling of the two units is $I_{T_C}$, i.e., the total current into two units, and where $I_{T_C}$ is less than $I_{T_1}$ and $I_{T_2}$. It will be apparent that there will be a directional laser beam only when there is a signal into both lasers. Thus, when a signal $I_1$ is applied alone to laser unit 10 by application from a source 13 via suitable conductors the current $I_1$ must reach the threshold $I_{T_1}$ before the laser unit 10 will produce a coherent light output. Similarly, for the case of unit 11, that is, $I_2$ must reach the value $I_{T_2}$ before coherent light will be emitted. However, when a total value of current $I_{T_C}$ is applied simultaneously or coincidently to each of the units 10 and 11 there will be a laser beam output from the coupled units, as indicated by the arrow labeled light output in FIGURE 2. Thus, by applying a value of current $I_{T_C}/2$ to each of units 10 and 11 from respective sources 13 and 14 an AND logical operation is realized, that is, there will be an output only when this value $I_{T_C}/2$ is applied to both unit 10 and unit 11.

In accordance with the present invention construction was carried out and for one typical laser pair having approximately equal lengths the threshold for the two lasers together occurred at 1.3 amps into each laser for a total of 2.6 amps ($I_{T_C}$). Separately the thresholds were 1.7 ($I_{T_1}$) and 2.0 ($I_{T_2}$). The current density lowering effect for this typical laser pair was shown in FIGURE 3 of the drawings. This pair is an electrically isolated AND device as described above where the inputs are between 1.3 and 1.7 amps because there is a directional laser beam only when there is an input signal to both lasers.

In the actual test made to set the conditions previously explained it was found difficult to separate the spectrum when the laser units 10 and 11 were of comparable length. Hence, pairs were constructed with one laser much longer than the other. One pair that was constructed to be especially well aligned consisted of one laser unit 155 microns long (laser 1) and one laser unit 368 microns long (laser 2) of equal widths and separated by a dimension on the order of 15 microns. This spacing resulted in about half of the light from one laser falling on the active region of the other. The current threshold of lasers 1 and 2 was 0.75 and 1.45 amps respectively, or about 48 and 40 amp/cm. of length of laser. Thus, the current density at threshold for the short laser (laser 1) was 1.2 times that of the long laser (laser 2). The threshold of the pair was 0.67 amp into each. Referring now to FIGURE 4 of the drawings the spectral output of the emission from the end of the short unit (laser 1) was observed for current of 1.0 amp. In the series of spectra shown in this figure the current in the long laser (laser 2) was gradually increased, but it never exceeded its threshold current of 1.45 amps. The spectrum of laser 1 alone had a separation of the Fabry-Perot lines of 4.53 angstroms and was in the region 8400–8435 angstroms whereas that of laser 2 had a separation of 1.94 angstroms and was in the region of 8445–8465 angstroms.

This is consistent with the observation that the spontaneous emission peak moves to shorter wave length as the current density is increased, so that the stimulated emission occurs at shorter wave lengths if the current density threshold is increased as by shortening the laser.

The most striking result demonstrated in FIGURE 4 is that the spectrum characteristic of laser 1 disappears as laser 2 is turned "on" and is replaced by a spectrum characteristic of laser 2. There is one anamolous line at 8455.5 angstroms at some current which was that characteristic of either laser alone. There is no evidence of mode pulling or of enhanced mode selectivity unless it is the fact that the strongest line occurs at what seems to be an accidental coincidence of the two spectra (8450.8 angstroms) if the spectrum of laser 1 was always stronger than from laser 2. Thus it appears that the two lasers do not act as a pair of coupled oscillators, but rather than the emission from laser 2 is amplified by laser 1. Laser 2 is affected by laser 1 but only in the sense that its threshold is lowered.

Near field photographs were made of the ends of the two lasers and when laser 1 was "on" alone only one filament was seen, but when laser 2 was turned "on" the filamentary structure spread across the active region of laser 1 but it was dissimilar in detail to the filamentary structure of the exposed end of laser 2. The lack of homogeneity in gain across laser 1 seems to destroy a faithful image.

Laser 1 seems to amplify the output of laser 2. The effect of laser 2 on laser 1 seems to be simply to lower its threshold. This can be understood on the basis of the argument that the shorter unit must be pumped to higher energies in the bands to achieve threshold than the longer unit (laser 2). Thus, at the wave length of the laser emission from the longer unit, the shorter unit has an inverted population and thus amplifies. Such is not the case for the long unit with respect to emission from the short unit. The light from the short unit simply pumps the long unit optically and lowers its threshold.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A radiant energy device comprising:
   (a) first and second separated semiconductor injection lasers each constituted of a crystalline body having a junction between adjacent regions of different conductivity characteristics and including a recombination radiation region for producing stimulated emission radiation when current above a threshold value is caused to flow across said junction;
   (b) each of said injection lasers having first and second surfaces on opposite ends of the crystalline body which are reflective and form with the laser region an optical cavity in which said stimulated emission radiation is propagated;
   (c) said laser regions of said first and second injection lasers being aligned in an essentially common plane to cause stimulated emission radiation produced in the laser region of one of said injection lasers to propagate along the laser region of the other of said injection lasers;
   (d) and current supply means for supplying to said first laser a first current less than said individual threshold current for said first laser and for supplying to said second laser a second current less than said individual threshold current for said second laser;
   (e) said first and second currents when individually applied being insufficient to produce stimulated emission radiation in either of said cavities and a coherent radiation output from said device but being effective when concurrently applied to produce stimulated emission radiation and provide a coherent radiant energy output from said device.

2. A radiant energy device comprising:
   (a) first and second separated semiconductor injection lasers each constituted of a crystalline body having a junction between adjacent regions of different conductivity characteristics and including a recombination radiation region for producing stimulated emission radiation when current above a threshold value is caused to flow across said junction;

(b) each of said injection lasers having first and second surfaces on opposite ends of the crystalline body which are reflective and form with the laser region an optical cavity in which said stimulated emission radiation is propagated;

(c) said laser regions of said first and second injection lasers being aligned in an essentially common plane to cause stimulated emission radiation produced in the laser region of one of said injection lasers to propagate along the laser region of the other of said injection lasers;

(d) said first laser having an individual threshold current $I_{T_1}$ necessary to produce stimulated emission radiation in said cavity of said first laser only and said second laser having an individual threshold current $I_{T_2}$ necessary to produce stimulated emission radiation in the cavity of said second laser only;

(e) and the spacing between said first and second lasers being sufficiently close that the total current $I_{T_c}$ necessary to be applied to both said lasers concurrently to produce stimulated emission radiation in said device is less than the sum of said individual threshold currents $I_{T_1}$ and $I_{T_2}$;

(f) and current supply means coupled to said first and second lasers for supplying current to said lasers to produce a coherent radiant energy output from said device.

3. The device of claim 2 wherein said current supply means includes means for applying a current $I_{T_c/2}$ to each of said first and second injection lasers.

4. The device of claim 2 wherein each of said injection lasers is constituted of gallium arsenide, the adjacent regions of each are p type and n type, and the junction in each is a p-n junction.

5. The device of claim 2 wherein said current supply means includes means for supplying current selectively to said first and second lasers to selectively produce coherent radiation outputs at different frequencies.

6. The device of claim 2 wherein said laser regions are aligned in a common plane to within 5° and the spacing between said lasers is less than 15 microns.

7. The device of claim 2 wherein the optical cavity of said first laser is longer than the optical cavity of said second laser.

8. A radiant energy device comprising:

(a) first and second separated semiconductor injection lasers each constituted of a crystalline body having a junction between adjacent regions of different conductivity characteristics and including a recombination radiation region for producing stimulated emission radiation when current above a threshold value is caused to flow across said junction;

(b) each of said injection lasers having first and second surfaces on opposite ends of the crystalline body which are reflective and form with the laser region an optical cavity in which said stimulated emission radiation is propagated;

(c) said laser regions of said first and second injection lasers being aligned in an essentially common plane to cause stimulated emission radiation produced in the laser region of one of said injection lasers to propagate along the laser region of the other of said injection lasers;

(d) the optical cavity of one of said lasers being larger than the optical cavity of the other of said lasers;

(e) and means coupled to said first and second lasers for applying currents selecively to said first and second lasers for selectively producing coherent radiant energy outputs at different frequencies from said radiant energy device.

9. The device of claim 8 wherein said current supply means includes means for supplying current to said first laser only to produce a coherent radiation output at a first frequency and for supplying current to both said first and second lasers to produce a coherent radiation output at a second frequency.

References Cited by the Examiner

UNITED STATES PATENTS

| | | | |
|---|---|---|---|
| Re. 25,632 | 8/1964 | Boyle et al | 350—211 |
| 2,748,041 | 5/1956 | Leverenz | 148—33 |
| 2,846,592 | 8/1958 | Rutz | 250—211 |
| 2,856,544 | 10/1958 | Ross | 307—88.5 |
| 2,967,952 | 1/1961 | Shockley | 307—88.5 |
| 3,051,840 | 8/1962 | Davis | 250—211 |
| 3,200,259 | 8/1965 | Braunstein | 307—88.5 |

JOHN W. HUCKERT, *Primary Examiner.*

R. SANDLER, *Assistant Examiner.*